(12) United States Patent  
Barz et al.

(10) Patent No.: US 7,160,491 B2  
(45) Date of Patent: Jan. 9, 2007

(54) STRUCTURAL REINFORCEMENT SYSTEM FOR AUTOMOTIVE VEHICLES

(75) Inventors: William J. Barz, St. Clair, MI (US); Thomas L. Coon, Lapeer, MI (US); Michael J. Czaplicki, Rochester, MI (US)

(73) Assignee: L&L Products, Inc., Romeo, MI (US)

( * ) Notice: Subject to any disclaimer, the term of this patent is extended or adjusted under 35 U.S.C. 154(b) by 0 days.

(21) Appl. No.: 11/136,058

(22) Filed: May 24, 2005

(65) Prior Publication Data

US 2005/0218697 A1 Oct. 6, 2005

Related U.S. Application Data

(63) Continuation of application No. 10/862,645, filed on Jun. 7, 2004, now Pat. No. 6,938,947, which is a continuation of application No. 10/603,674, filed on Jun. 25, 2003, now Pat. No. 6,921,130, which is a continuation of application No. 09/655,965, filed on Sep. 6, 2000, now Pat. No. 6,619,727, which is a continuation of application No. 09/502,686, filed on Feb. 11, 2000, now Pat. No. 6,467,834.

(51) Int. Cl.  
*B29C 44/06* (2006.01)  
*B29C 44/12* (2006.01)

(52) U.S. Cl. .................. 264/46.6; 264/46.5; 264/46.7

(58) Field of Classification Search ............... 264/45.9, 264/46.5, 46.6, 46.7  
See application file for complete search history.

(56) References Cited

U.S. PATENT DOCUMENTS

| | | |
|---|---|---|
| 1,814,677 A | 7/1931 | Fennema |
| 3,649,375 A | 3/1972 | Venkatesan |
| 3,868,796 A | 3/1975 | Bush |
| 4,029,128 A | 6/1977 | Yamagishi |
| 4,083,384 A | 4/1978 | Horne et al. |
| 4,463,870 A | 8/1984 | Coburn, Jr. et al. |
| 4,695,343 A | 9/1987 | Wycech |
| 4,769,391 A | 9/1988 | Wycech |
| 4,810,548 A | 3/1989 | Ligon, Sr. et al. |
| 4,813,690 A | 3/1989 | Coburn, Jr. |
| 4,822,011 A | 4/1989 | Goldbach et al. |
| 4,901,395 A | 2/1990 | Semrau |
| 4,946,737 A | 8/1990 | Lindeman et al. |
| 4,984,406 A | 1/1991 | Friesen |
| 5,040,803 A | 8/1991 | Cieslik et al. |
| 5,072,952 A | 12/1991 | Irrgeher et al. |

(Continued)

FOREIGN PATENT DOCUMENTS

DE 3627725 A1 2/1988

(Continued)

OTHER PUBLICATIONS

Written Opinion dated Jan. 3, 2003 for Application No. PCT/US01/01648.

(Continued)

*Primary Examiner*—Allan R. Kuhns  
(74) *Attorney, Agent, or Firm*—Dobrusin & Thennisch PC (57) ABSTRACT

An automotive vehicle frame reinforcement system has a skeleton member designed to be secured to a vehicle frame, such as a roof or pillar section. An expandable material, such as an epoxy-based reinforcing foam, is disposed on the skeleton member. Once the system is attached to the frame, the foam expands and cures during an automobile assembly operation, bonding the reinforcement system to the frame. As a result, the reinforcement system provides enhanced load distribution over the vehicle frame without adding excessive weight.

20 Claims, 4 Drawing Sheets

U.S. PATENT DOCUMENTS

| | | |
|---|---|---|
| 5,102,188 A | 4/1992 | Yamane |
| 5,213,391 A | 5/1993 | Takagi |
| 5,358,397 A | 10/1994 | Ligon et al. |
| 5,382,397 A | 1/1995 | Turner, Jr. |
| 5,575,526 A | 11/1996 | Wycech |
| 5,577,784 A | 11/1996 | Nelson |
| 5,660,116 A | 8/1997 | Dannawi et al. |
| 5,725,272 A | 3/1998 | Jones |
| 5,755,486 A | 5/1998 | Wycech |
| 5,819,408 A | 10/1998 | Catlin |
| 5,851,626 A | 12/1998 | McCorry et al. |
| 5,871,849 A | 2/1999 | Lepine |
| 5,878,784 A | 3/1999 | Sales et al. |
| 5,894,071 A | 4/1999 | Merz et al. |
| 5,901,752 A | 5/1999 | Lundman |
| 5,902,656 A | 5/1999 | Hwang |
| 5,979,902 A | 11/1999 | Chang et al. |
| 5,992,923 A | 11/1999 | Wycech |
| 5,997,077 A | 12/1999 | Siebels et al. |
| 6,006,484 A | 12/1999 | Geissbuhler |
| 6,040,350 A | 3/2000 | Fukui |
| 6,053,210 A | 4/2000 | Chapman et al. |
| 6,058,673 A * | 5/2000 | Wycech ................ 52/721.4 |
| 6,073,991 A | 6/2000 | Naert |
| 6,092,864 A * | 7/2000 | Wycech et al. ............ 296/204 |
| 6,146,565 A | 11/2000 | Keller |
| 6,174,932 B1 | 1/2001 | Pachl et al. |
| 6,189,953 B1 | 2/2001 | Wycech |
| 6,196,621 B1 | 3/2001 | VanAssche et al. |
| 6,197,403 B1 | 3/2001 | Brown et al. |
| 6,199,940 B1 | 3/2001 | Hopton et al. |
| 6,232,433 B1 | 5/2001 | Narayan |
| 6,233,826 B1 | 5/2001 | Wycech |
| 6,237,304 B1 | 5/2001 | Wycech |
| 6,247,287 B1 | 6/2001 | Takabatake |
| 6,253,524 B1 | 7/2001 | Hopton et al. |
| 6,263,635 B1 | 7/2001 | Czaplicki |
| 6,267,436 B1 | 7/2001 | Takahara |
| 6,270,600 B1 | 8/2001 | Wycech |
| 6,272,809 B1 | 8/2001 | Wycech |
| 6,276,105 B1 | 8/2001 | Wycech |
| 6,277,898 B1 | 8/2001 | Pachl et al. |
| 6,281,260 B1 | 8/2001 | Hanley, IV et al. |
| 6,287,666 B1 | 9/2001 | Wycech |
| 6,296,298 B1 | 10/2001 | Barz |
| 6,303,672 B1 | 10/2001 | Papalos et al. |
| 6,305,136 B1 | 10/2001 | Hopton et al. |
| 6,311,452 B1 | 11/2001 | Barz et al. |
| 6,315,938 B1 | 11/2001 | Jandali |
| 6,319,964 B1 | 11/2001 | Blank et al. |
| 6,321,793 B1 | 11/2001 | Czaplicki et al. |
| 6,332,731 B1 | 12/2001 | Wycech |
| 6,341,467 B1 | 1/2002 | Wycech |
| 6,348,513 B1 | 2/2002 | Hilborn et al. |
| 6,357,819 B1 | 3/2002 | Yoshino |
| 6,358,584 B1 | 3/2002 | Czaplicki |
| 6,368,438 B1 | 4/2002 | Chang et al. |
| 6,372,334 B1 | 4/2002 | Wycech |
| 6,378,933 B1 | 4/2002 | Schoen et al. |
| D457,120 S | 5/2002 | Broccardo et al. |
| 6,382,635 B1 | 5/2002 | Fitzgerald |
| 6,383,610 B1 | 5/2002 | Barz et al. |
| 6,389,775 B1 | 5/2002 | Steiner et al. |
| 6,406,078 B1 | 6/2002 | Wycech |
| 6,413,611 B1 | 7/2002 | Roberts et al. |
| 6,419,305 B1 | 7/2002 | Larsen |
| 6,422,575 B1 | 7/2002 | Czaplicki et al. |
| H2047 H | 9/2002 | Harrison et al. |
| 6,455,146 B1 | 9/2002 | Fitzgerald |
| 6,467,834 B1 | 10/2002 | Barz et al. |
| 6,471,285 B1 | 10/2002 | Czaplicki et al. |
| 6,474,722 B1 | 11/2002 | Barz |
| 6,474,723 B1 | 11/2002 | Czaplicki et al. |
| 6,475,577 B1 | 11/2002 | Hopton et al. |
| 6,478,367 B1 | 11/2002 | Ishikawa |
| 6,482,486 B1 | 11/2002 | Czaplicki et al. |
| 6,482,496 B1 | 11/2002 | Wycech |
| 6,491,336 B1 | 12/2002 | Beckmann et al. |
| 6,502,821 B1 | 1/2003 | Schneider |
| 6,519,854 B1 | 2/2003 | Blank |
| 6,523,857 B1 | 2/2003 | Hopton et al. |
| 6,523,884 B1 | 2/2003 | Czaplicki et al. |
| 6,550,847 B1 | 4/2003 | Honda et al. |
| 6,561,571 B1 | 5/2003 | Brennecke |
| 6,573,309 B1 | 6/2003 | Reitenbach et al. |
| 6,575,526 B1 | 6/2003 | Czaplicki et al. |
| 6,607,238 B1 | 8/2003 | Barz |
| 6,619,727 B1 | 9/2003 | Barz et al. |
| 6,620,501 B1 | 9/2003 | Kassa et al. |
| 6,634,698 B1 | 10/2003 | Kleino |
| 6,641,208 B1 | 11/2003 | Czaplicki et al. |
| 6,668,457 B1 | 12/2003 | Czaplicki |
| 6,682,818 B1 | 1/2004 | Czaplicki et al. |
| 6,777,049 B1 | 8/2004 | Sheldon et al. |
| 6,786,533 B1 | 9/2004 | Bock et al. |
| 6,851,232 B1 | 2/2005 | Schwegler |
| 6,887,914 B1 | 5/2005 | Czaplicki et al. |
| 6,890,021 B1 | 5/2005 | Bock et al. |
| 6,905,745 B1 | 6/2005 | Sheldon et al. |
| 6,920,693 B1 | 7/2005 | Hankins et al. |
| 6,921,130 B1 | 7/2005 | Barz et al. |
| 6,923,499 B1 | 8/2005 | Wieber et al. |
| 6,928,736 B1 | 8/2005 | Czaplicki et al. |
| 6,932,421 B1 | 8/2005 | Barz et al. |
| 6,938,947 B1 | 9/2005 | Barz et al. |
| 6,941,719 B1 | 9/2005 | Busseuil et al. |
| 6,953,219 B1 | 10/2005 | Lutz et al. |
| 6,955,593 B1 | 10/2005 | Lewis et al. |
| 2001/0020794 A1 | 9/2001 | Ishikawa |
| 2001/0042353 A1 | 11/2001 | Honda et al. |
| 2002/0033617 A1 | 3/2002 | Blank |
| 2002/0053179 A1 | 5/2002 | Wycech |
| 2002/0054988 A1 | 5/2002 | Wycech |
| 2002/0074827 A1 | 6/2002 | Fitzgerald et al. |
| 2003/0001469 A1 | 1/2003 | Hankins et al. |
| 2003/0039792 A1 | 2/2003 | Hable et al. |
| 2003/0050352 A1 | 3/2003 | Guenther et al. |
| 2005/0102815 A1 | 5/2005 | Larsen |
| 2005/0126286 A1 | 6/2005 | Hable et al. |
| 2005/0127145 A1 | 6/2005 | Czaplicki et al. |
| 2005/0159531 A1 | 7/2005 | Ferng |
| 2005/0166532 A1 | 8/2005 | Barz |
| 2005/0172486 A1 | 8/2005 | Carlson et al. |
| 2005/0194706 A1 | 9/2005 | Kosal et al. |
| 2005/0212326 A1 | 9/2005 | Marion |
| 2005/0212332 A1 | 9/2005 | Sheldon et al. |
| 2005/0217785 A1 | 10/2005 | Hable et al. |
| 2005/0218697 A1 | 10/2005 | Barz et al. |
| 2005/0230165 A1 | 10/2005 | Thomas et al. |

FOREIGN PATENT DOCUMENTS

| | | |
|---|---|---|
| DE | 4028895 C1 | 2/1992 |
| DE | 42 27 393 A1 | 3/1993 |
| DE | 196 35 734 A1 | 4/1997 |
| DE | 196 44 047 A1 | 5/1998 |
| DE | 196 48 164 A1 | 5/1998 |
| DE | 198 12 288 C1 | 5/1999 |
| DE | 197 53 658 A1 | 6/1999 |
| DE | 299 04 705 U1 | 7/1999 |
| DE | 198 56 255 C1 | 1/2000 |
| DE | 19858903 A1 | 6/2000 |
| EP | 0 236 291 | 9/1987 |
| EP | 0 679 501 A1 | 11/1995 |

| | | | |
|---|---|---|---|
| EP | 0 775 721 A1 | 5/1997 |
| EP | 0 893 332 B1 | 1/1999 |
| EP | 1 006 022 A2 | 6/2000 |
| EP | 1 084 816 A2 | 3/2001 |
| EP | 1 122 156 A2 | 8/2001 |
| EP | 1 031 496 B1 | 12/2001 |
| EP | 1 256 512 A2 | 11/2002 |
| EP | 1 006 022 B1 | 9/2003 |
| EP | 1 362 683 A2 | 11/2003 |
| EP | 1 362 769 A1 | 11/2003 |
| EP | 1 157 916 B1 | 12/2005 |
| FR | 2 539 693 | 7/1984 |
| FR | 2 749 263 | 12/1997 |
| GB | 2 083 162 A | 3/1982 |
| GB | 2 156 412 A | 10/1985 |
| GB | 2 325 509 A | 11/1998 |
| JP | 58-87668 | 6/1983 |
| JP | 61118211 | 6/1986 |
| JP | 01164867 | 6/1989 |
| JP | 7-117728 | 5/1995 |
| JP | 7-31569 | 6/1995 |
| JP | 10053156 A | 2/1998 |
| JP | 2001191947 | 7/2001 |
| JP | 02001191949 A | 7/2001 |
| WO | WO 87/01978 | 4/1987 |
| WO | WO 99/64287 | 12/1997 |
| WO | WO 98/36944 | 8/1998 |
| WO | WO 99/28575 | 6/1999 |
| WO | WO 99/48746 | 9/1999 |
| WO | WO 00/03894 | 1/2000 |
| WO | WO 00/37302 | 6/2000 |
| WO | WO 00/55444 | 9/2000 |
| WO | WO 01/54936 | 8/2001 |
| WO | WO 01/56845 | 8/2001 |
| WO | WO 01/57130 | 8/2001 |
| WO | WO 01/71225 | 9/2001 |
| WO | WO 01/83206 | 11/2001 |
| WO | WO 01/88033 | 11/2001 |
| WO | WO 03/042024 A1 | 5/2003 |
| WO | WO 05/077634 A2 | 8/2005 |

OTHER PUBLICATIONS

Klein, M. and Adam Opel AG, "Application of Structural Foam in the Body in White—Reinforcement Roof Rail Side of the OPEL ASTRA", VDI Berichte, pp. 227-249.

Born, Peter and Bernd Mayer, "Structural Bonding in Automotive Applications", AutoTechnology, Apr. 2004, pp. 44-47.

International Search Report dated Apr. 26, 2001. PCT/US01/01648. (1001.021WO).

Hopton et al., Application of a Structural Reinforcing Material to Improve Vehicle NVH Characteristics.

Lilley et al., Comparison of Preformed Acoustic Baffles and Two-component Polyurethane foams for Filing Body Cavity.

Lilley et al., A Comparison of NVH Treatments for Vehicle Floorplan Applications.

Lilley et al., Vehicle Acoustic Solutions.

Mansour et al., Optimal Bonding Thickness for Vehicle Stiffness.

* cited by examiner

_Fig-6_

_Fig-7_

STRUCTURAL REINFORCEMENT SYSTEM FOR AUTOMOTIVE VEHICLES

"This application is a continuation of application number 10/862,645 filed on Jun. 7, 2004, now U.S. Pat. No. 6,938,947 which is a continuation of application No. 10/603,674 filed on Jun. 25, 2003, now U.S. Pat. No. 6,921,130 which is a continuation of application Ser. No. 09/655,965 filed on Sep. 6, 2000, now U.S. Pat. No. 6,619,727, which is a continuation of application Ser. No. 09/502,686 filed on Feb. 11, 2000, now U.S. Pat. No. 6,467,834."

FIELD OF THE INVENTION

The present invention relates generally to a reinforced structural member for use in strengthening the stiffness and strength of a frame assembly. More particularly, the invention relates to a vehicle frame system of an automotive vehicle that is reinforced by a member coated over a portion of its surface with an expandable material, the combination of which increases the structural stiffness and strength of the automotive vehicle.

BACKGROUND OF THE INVENTION

For many years the transportation industry has been concerned with designing reinforced structural members that do not add significantly to the weight of a vehicle. U.S. Pat. Nos. 5,755,486; 4,901,500; and 4,751,249 described prior art reinforcing devices. While these prior art devices may be advantageous in some circumstances, there is needed a simple low cost structure that permits coupling the reinforcement member to a variety of structures of varying geometric configurations. In the automotive industry there is also a need for a relatively low cost system for reinforcing automotive vehicle frame structures.

SUMMARY OF THE INVENTION

The present invention is directed to a structural reinforcement system, and particularly one for reinforcing automotive vehicle frame structures, such as (without limitation) vehicle roof and pillar structures. The system generally employs a skeleton member adapted for stiffening the structure to be reinforced and helping to redirect applied loads. In use, the skeleton member is in contact, over at least a portion of its outer surface, with an energy absorbing medium, and particularly heat activated bonding material. In a particular preferred embodiment, the skeleton member is a molded metal, or composite frame and it is at least partially coated with foamable epoxy-based resin, such as L5206, L5207, L5208 or L5209 structural foam commercially available from L & L Products of Romeo, Mich.

In one embodiment the skeleton member along with a suitable amount of bonding or load transfer medium is placed in a cavity defined within an automotive vehicle, such as a vehicle roof structure, pillar structure or both. The bonding medium is activated to accomplish expansion of the resin in the space defined between the skeleton member and the wall structure defining the cavity. The resulting structure includes the wall structure joined to the skeleton member with the aid of the structural foam.

DETAILED DESCRIPTION OF THE DRAWINGS

The features and inventive aspects of the present invention will become more apparent upon reading the following detailed description, claims, and drawings, of which the following is a brief description:

DETAILED DESCRIPTION OF PREFERRED EMBODIMENT

Figure 1:
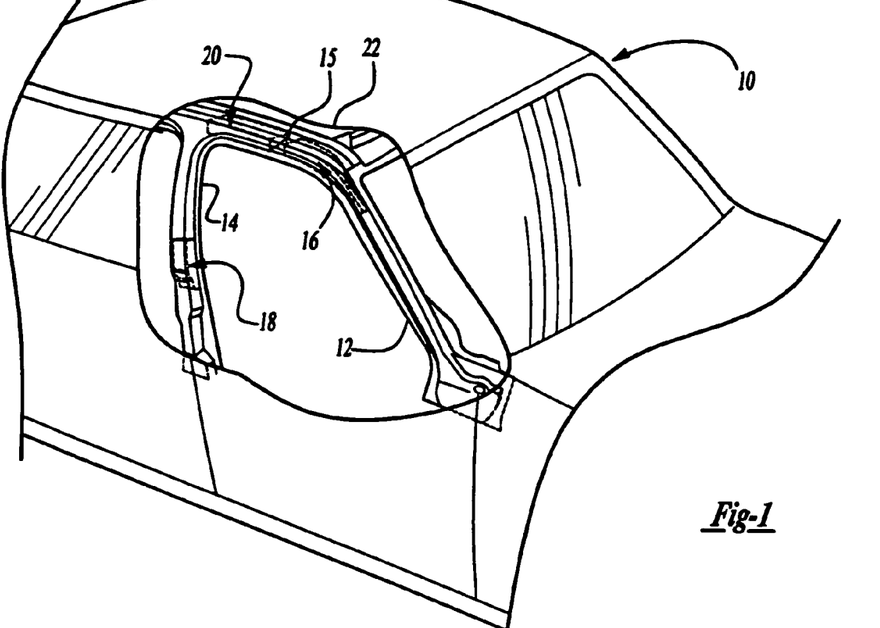
FIG. 1 is a perspective view of aspects of an automotive vehicle roof and pillar structure, illustrating an A-Pillar and B-Pillar.

FIG. 1 illustrates an example of an automotive vehicle showing portions of a frame structure. As will be appreciated, it is common for such structures to include a plurality of hollow vehicle frame members that are joined to define the frame. One such structure, for purposes of illustration (without limitation) is a vehicle roof and pillar structure. As will be recognized, included in the roof and pillar structure may also be windows, sunroofs or other removable tops, vehicle doors and door components, headliners (with or without overhead accessories), or the like. As discussed later, other vehicle frame members are also contemplated within the scope of the present invention.

While FIG. 1 illustrates an A-Pillar 12 and B-Pillar 14, other pillars may likewise be employed in accordance with the present invention. In FIG. 1 there is shown also a portion of the roof structure 16 that bridges the A-Pillar 12 and B-Pillar 14.

Depending upon vehicle design, it is possible that the roof structure 16 bridging the A-Pillar and B-Pillar is relatively indistinguishable between the A-Pillar and B-Pillar such that the A-Pillar structure and B-Pillar structure effectively adjoin one another. In such instances the uppermost portion of the pillar structure is deemed the roof structure.

Reinforcement of the roof and pillar sections is accomplished by locating one or more skeleton members in accordance with the present invention in a hollow or cavity portion of the roof or pillar. FIG. 1 illustrates examples of this by showing a first member 16, a second member 18 and a third member 20 in such locations. The members 16, 18 and 20 preferably are sealingly secured to at least one of the roof and pillar sections by a bonding material, which upon heat activation produces adhesion to skeleton members to help secure the members and the walls defining the hollow from movement within the hollow portion.

Though other heat activated materials are possible, a preferred heat activated material is an expandable plastic, and preferably one that is foamable. A particularly preferred material is an epoxy-based structural foam. For example, without limitation, in one embodiment, the structural foam is an epoxy-based material, including an ethylene copolymer or terpolymer that may possess an alpha-olefin. As a copolymer or terpolymer, the polymer is composed of two or three different monomers, i.e., small molecules with high chemical reactivity that are capable of linking up with similar molecules.

A number of epoxy-based structural reinforcing foams are known in the art and may also be used to produce the structural foam. A typical structural foam includes a polymeric base material, such as an epoxy resin or ethylene-based polymer which, when compounded with appropriate ingredients (typically a blowing and curing agent), expands and cures in a reliable and predicable manner upon the application of heat or the occurrence of a particular ambient condition. From a chemical standpoint for a thermally-activated material, the structural foam is usually initially processed as a flowable thermoplastic material before curing. It will cross-link upon curing, which makes the material incapable of further flow.

An example of a preferred structural foam formulation is an epoxy-based material that is commercially available from L&L Products of Romeo, Mich., under the designations L5206, L5207, L5208 and L5209. One advantage of the preferred structural foam materials 14 over prior art materials is that the preferred materials can be processed in several ways. The preferred materials can be processed by injection molding, extrusion compression molding or with a mini-applicator. This enables the formation and creation of part designs that exceed the capability of most prior art materials. In one preferred embodiment, the structural foam (in its uncured state) generally is dry or relatively free of tack to the touch.

While the preferred materials for fabricating the structural foam have been disclosed, the structural foam can be formed of other materials provided that the material selected is heat-activated or otherwise activated by an ambient condition (e.g. moisture, pressure, time or the like) and cures in a predictable and reliable manner under appropriate conditions for the selected application. One such material is the epoxy based resin disclosed in U.S. patent application Ser. No. 09/268,810, the teachings of which are incorporated herein by reference, filed with the United States Patent and Trademark Office on Mar. 8, 1999 by the assignee of this application. Some other possible materials include, but are not limited to, polyolefin materials, copolymers and terpolymers with at least one monomer type an alpha-olefin, phenol/formaldehyde materials, phenoxy materials, and polyurethane materials with high glass transition temperatures. See also, U.S. Pat. Nos. 5,766,719; 5,755,486; 5,575,526; and 5,932,680, (incorporated by reference). In general, the desired characteristics of the structural foam include relatively high stiffness, high strength, high glass transition temperature (typically greater than 70 degrees Celsius), and good corrosion resistance properties. In this manner, the material does not generally interfere with the materials systems employed by automobile manufacturers.

In applications where a heat activated, thermally expanding material is employed, an important consideration involved with the selection and formulation of the material comprising the structural foam is the temperature at which a material reaction or expansion, and possibly curing, will take place. For instance, in most applications, it is undesirable for the material to be reactive at room temperature or otherwise at the ambient temperature in a production line environment. More typically, the structural foam becomes reactive at higher processing temperatures, such as those encountered in an automobile assembly plant, when the foam is processed along with the automobile components at elevated temperatures or at higher applied energy levels, e.g., during painting preparation steps. While temperatures encountered in an automobile assembly operation may be in the range of about 148.89° C. to 204.44° C. (about 300° F. to 400° F.), body and paint shop applications are commonly about 93.33° C. (about 200° F.) or slightly higher. If needed, blowing agent activators can be incorporated into the composition to cause expansion at different temperatures outside the above ranges.

Generally, suitable expandable foams have a range of expansion ranging from approximately 0 to over 1000 percent. The level of expansion of the structural foam 14 may be increased to as high as 1500 percent or more. Typically, strength is obtained from products that possess low expansion.

Figure 2:
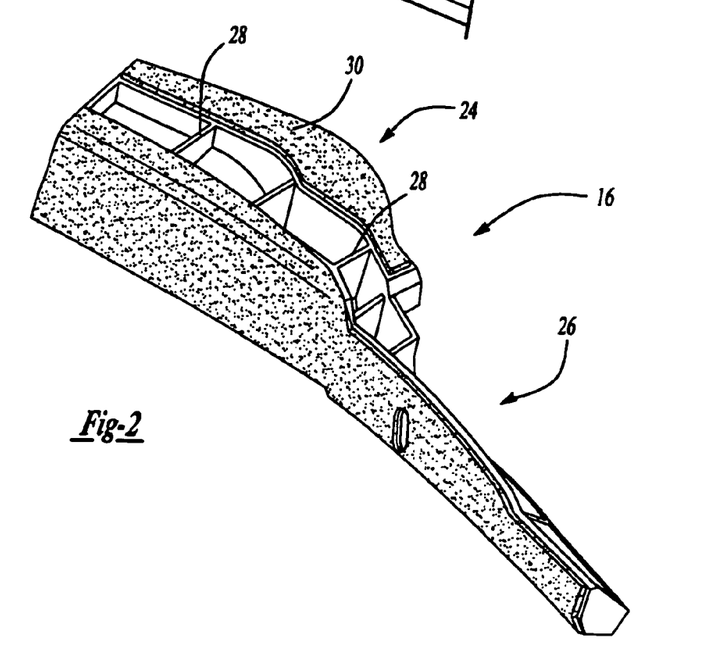
FIG. 2 is a perspective view of a skeleton member coated with an expandable resin in accordance with the present inventions.
Figure 3:
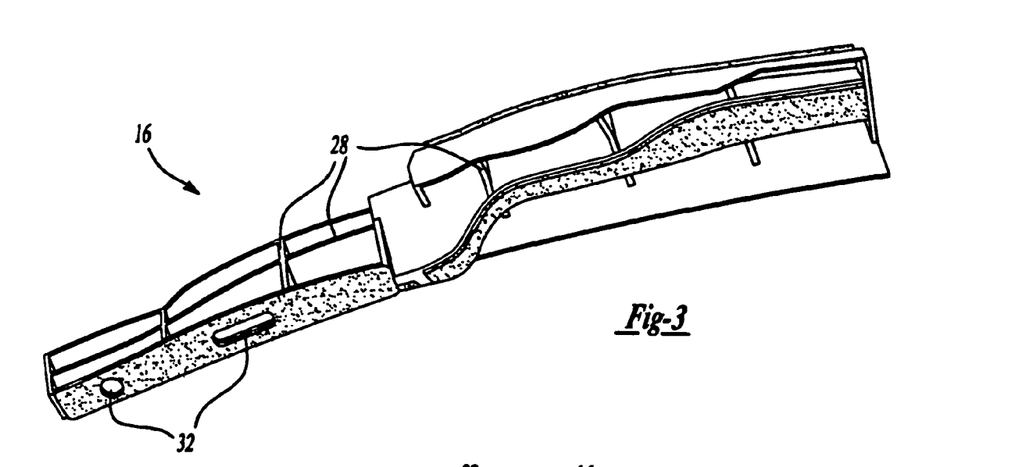
FIG. 3 is another perspective view of the structure shown in FIG. 2.

Referring now to FIG. 2, there is shown one example of a first reinforcement member 16 in accordance with the present invention. This illustrated embodiment is useful, for instance, for reinforcing the juncture between an automotive vehicle roof 22 and the A-Pillar. The first member 16 has a first portion 24 adapted for placement in a cavity defined in a vehicle roof structure, and a second portion 26 adapted for placement in a cavity defined in a vehicle pillar, such as an A-Pillar as illustrated. Preferably the cross sectional silhouette of both the first portion 24 and the second portion 26 is generally complementary to the walls of the cavity defined in opposing roof or pillar structure. Though the member may also be solid, the member preferably includes a skeleton frame that is prepared to minimize weight while still achieving desired rigidity. Accordingly, the skeleton frame preferably is designed to employ a plurality of ribs that effectively are beamlike (e.g. I-beam) in function, thus helping to selectively strengthen the member. The ribs are illustrated in FIGS. 2 and 3 generally running orthogonal to one another. However, this is not intended as limiting, as the rib configuration may be varied depending upon the desired outcome.

In general, however, a rib is placed adjacent to, and in generally non-parallel relationship to a surface over which loads will be distributed. In FIG. 2, by way of illustration, a plurality of first ribs 28 are located adjacent to a surface of the member (shown covered with expandable material 30). FIG. 3 also shows how the ribs 28 (reference numerals illustrating some of the ribs, but not all) can be configured relative to one another to provide additional stabilization. In general, because of the relatively high bending moment of the ribs, without unduly increasing weight of the member, rigidity can be increased in locations where loads are anticipated by selective design and placement of the ribs. At the same time, enhanced load distribution is possible from the continuous surfaces and foam employed with the ribs to spread energy. Moreover, weight savings can be achieved by such design. For instance, the structure of the member is also such that over at least one quarter, preferably one half and more preferably greater than about three quarter of the length of the member at any given point between the ends of said member, the cross-sectional area of the member is less than 75%, more preferably less than 50% and still more preferably less than 20% of the overall area for a silhouette profile taken such point In this manner, weight reductions of up to about 50%, more preferably about 70%, and still more preferably about 90%, are possible as compared with a solid structure of the same material.

It should be appreciated that other devices for securing the members 16, 18, and 20 to the vehicle frame may be employed, including suitable fasteners, straps, or other mechanical interlocks. Through-holes 32 may also be defined within the structure to assist in vehicle manufacturing. In a particularly preferred embodiment, the skeleton members of the present invention are injection molded plastics, such as nylons. However, other materials and manufacturing techniques may be employed similarly to achieve like results. For instance, high strength to weight metal components, such as aluminum, titanium, magnesium or the like, may be employed, as well as polymer composites such as a layered polymer with fibers capable of compression molding to generate strength.

Returning to FIG. 1, when employed in an automotive vehicle in accordance with the present invention, the skeleton members, particularly when coated with an expandable material (such as a heat activated epoxy based foam) can reinforce the region for which it is used by the combination of increased stiffening from the presence of beam-like ribs and load distribution through the combination of relatively high surface area continuous surfaces and an expandable material.

Figure 4:
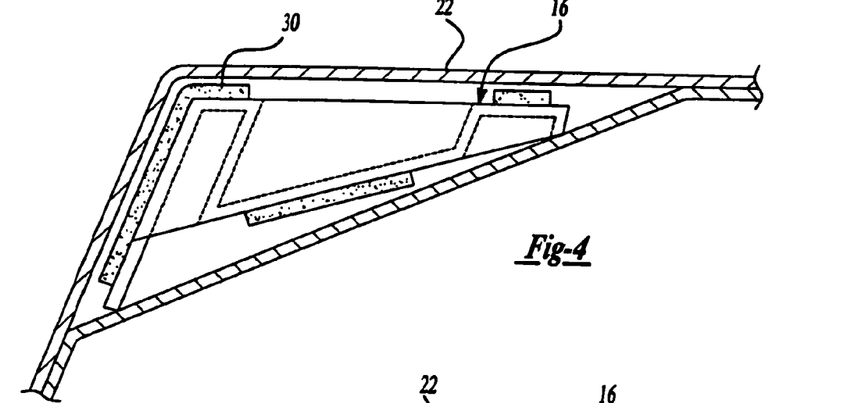
FIG. 4 is a sectional view showing a coated skeleton member prior to activation of an expandable resin.
Figure 5:
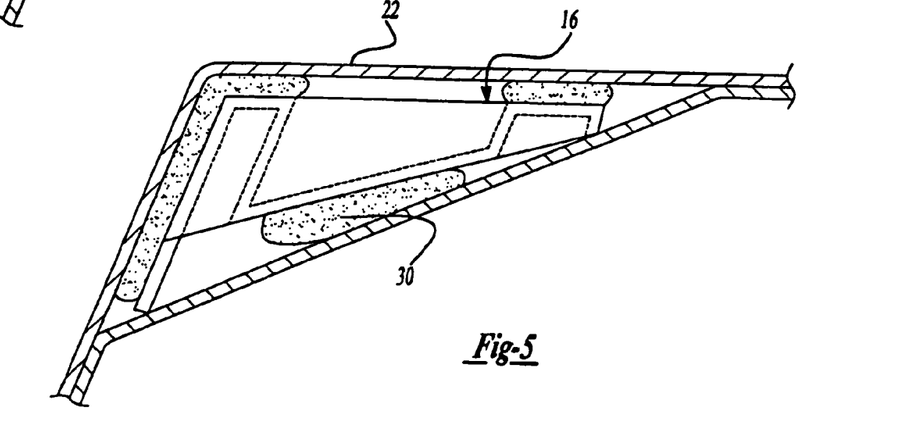
FIG. 5 illustrates the structure of FIG. 4 after the expandable resin has been expanded.

In another preferred embodiment, the expandable material, upon expansion will serve as a sealant for blocking the passage of fluids or other elements through the cavity. Thus, in such embodiment, it is preferred that the expandable material is provided continuously about generally the entirety of the periphery of any portion of the skeleton member that does not sealingly contact the automobile frame structure. FIG. 5 illustrates this by showing how skeleton member 16 coated with an expandable material 30 (shown in FIG. 4) is sealed in place upon activation of the material 30 (shown expanded in FIG. 5).

Figures 6, 7:
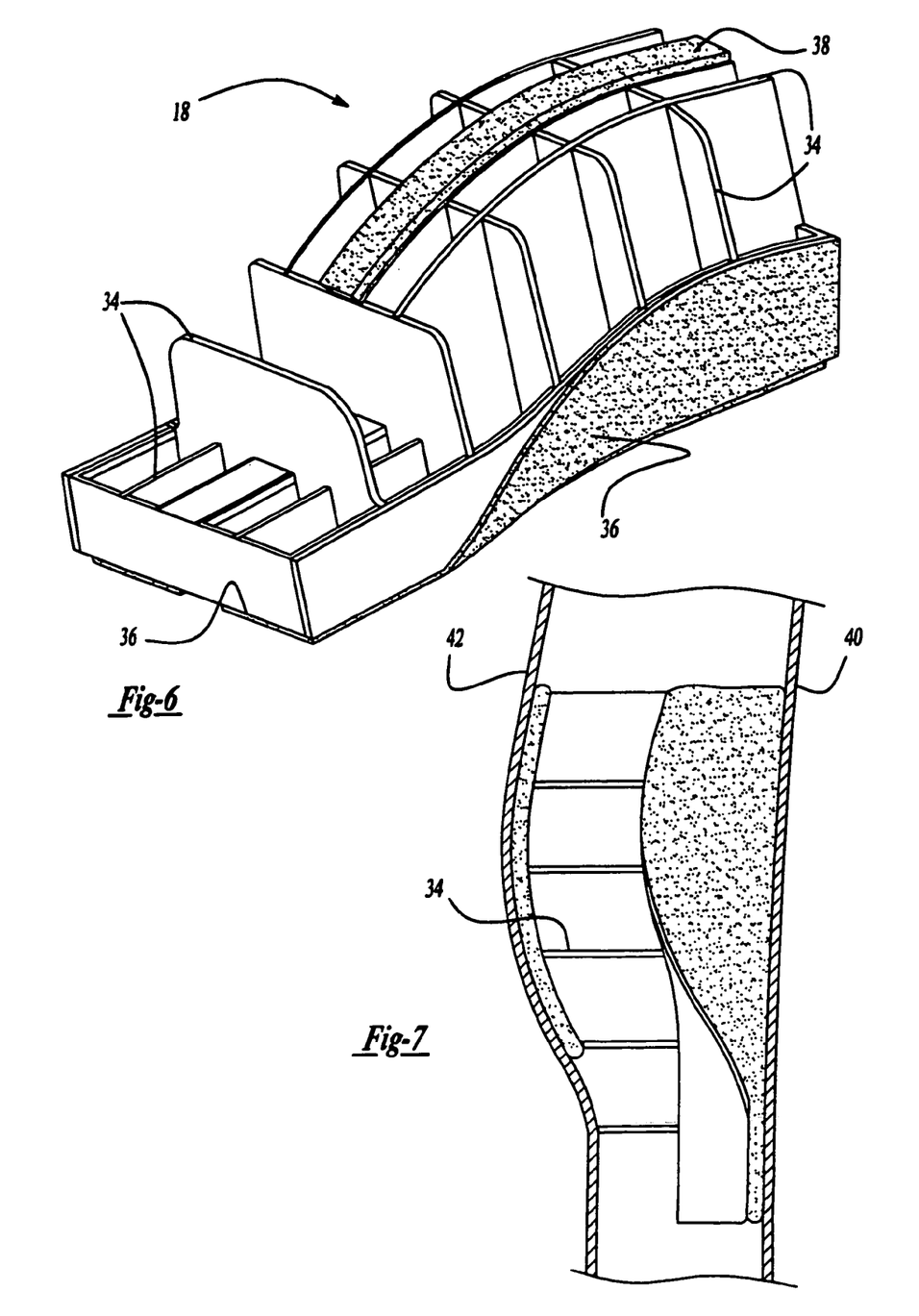
FIG. 6 is a perspective view of another illustrative structure in accordance with the present invention.
FIG. 7 is a side elevation view of the structure of FIG. 6.

FIGS. 6 through 9 illustrate other embodiments in accordance with the present invention. In FIGS. 6 and 7, there is shown a reinforcement member 18 adapted for a pillar of an automotive vehicle. The structure of the skeleton member employs a plurality of ribs 34 adjoining one or more continuous surfaces 36 (shown coated with an expandable material 38).

The expandable material is shown in its expanded state. As the skilled artisan will appreciate, not all ribs are shown, and the specific design of each rib configuration will vary depending upon its intended use, and the geometry of the region being reinforced (e.g. walls 40 and 42 of the vehicle frame structure defining the cavity). Further expandable material may be employed in contact with the ribs.

Figure 8:
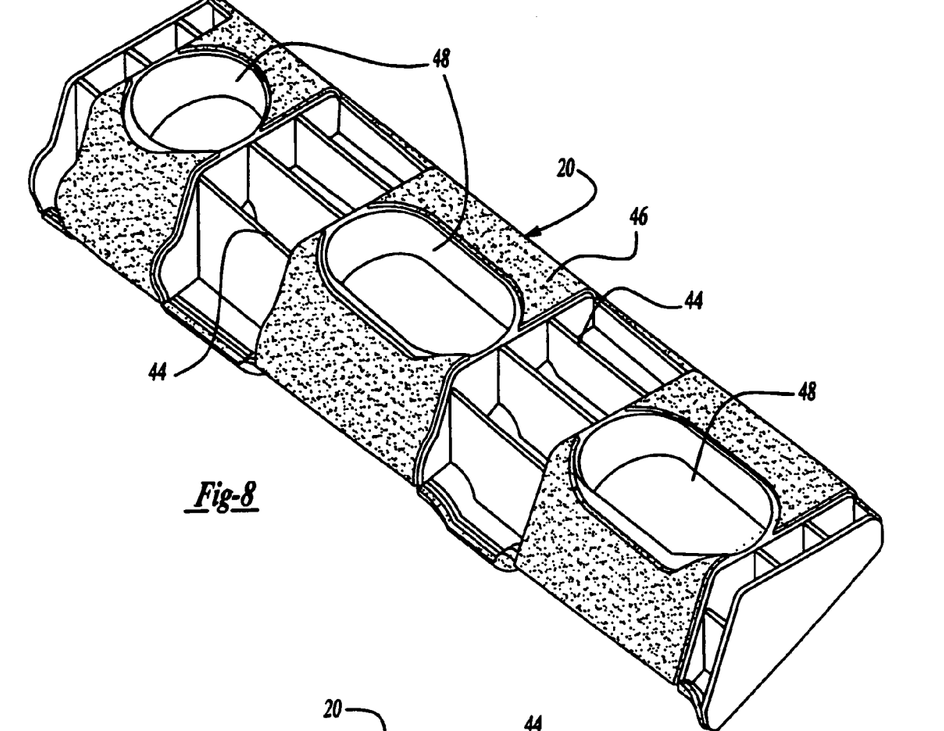
FIG. 8 illustrates yet another structure in accordance with the present invention.
Figure 9:
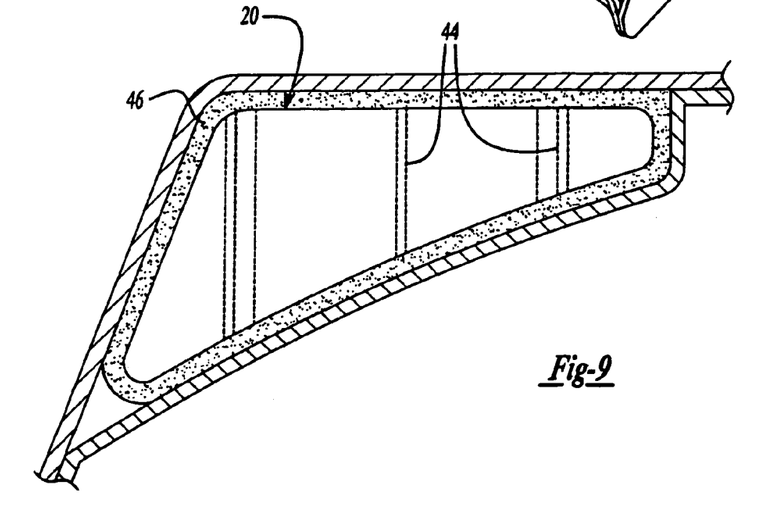
FIG. 9 illustrates the structure of FIG. 8 employed combination with a vehicle pillar structure.

FIGS. 8 and 9 illustrate yet another embodiment according to the present invention. In this embodiment, a skeleton member 20 having a plurality ribs 44 and generally continuous surfaces (shown coated with a layer 46) is fabricated to also include structure for facilitating vehicle manufacture. Specifically, the embodiment shown includes a plurality of through-holes 48, for enabling body shop weld access or the like. As shown in FIG. 9, in this embodiment, the expandable material layer 46, upon expansion, covers the circumference of a cross section of the structure.

The skilled artisan will appreciate that the use of the reinforcements disclosed herein is not intended as being limited only to illustrate the locations shown in FIG. 1. They can be used in any location within an automotive vehicle frame. For instance, other reinforced locations are also possible including but not limited to pillar to door regions, roof to pillar, mid-pillar, roof rails, windshield or other window frames, deck lids, hatches, removable top to roof locations, other vehicle beltline locations, motor rails, lower sills, cross members, lower rails, and the like. Moreover, vehicle roof tops may be reinforced to support additional loads in accordance with the present invention. In the same manner as was described above in the context of a roof and pillar system, a reinforcement frame member having an expandable material thereon is placed in a cavity defined in the vehicle frame structure. The material is expanded to help secure the reinforcement in place.

The preferred embodiment of the present invention has been disclosed. A person of ordinary skill in the art would realize however, that certain notifications would come within the teachings of this invention. Therefore, the following claims should be studied to determine the true scope and content of the invention.

What is claimed is:

1. A method of reinforcing a structure of an automotive vehicle, the method comprising:
    molding a plastic skeleton member, the skeleton member having a plurality of ribs disposed along a length of the skeleton member wherein each of the plurality of ribs extends transverse relative to the length and the plurality of ribs are spaced a part from each other;
    attaching a substantially non-tacky expandable material to the skeleton member to form a reinforcement member;
    locating the reinforcement member within a cavity of the structure of the automotive vehicle; and
    activating the expandable material by exposure to elevated temperature to foam, cure and adhere to walls of the structure defining the cavity thereby forming a reinforced system.

2. The method of claim 1 wherein the skeleton member includes a first longitudinal outwardly facing surface opposite a second outward facing longitudinal surface and wherein both the first surface and the second surface are interconnected by the plurality of ribs and are substantially entirely covered by the expandable material.

3. The method of claim 1 wherein the step of activating the expandable material includes activating the expandable material to form a structural foam.

4. The method of claim 1 wherein the skeleton members includes at least one laterally extending rib and at least one longitudinally extending rib and the at least one laterally extending rib intersects the at least one longitudinally extending rib, 5. The method of claim 4 wherein the at least one laterally extending rib and the at least one longitudinally extending rib of the first portion and are substantially devoid of the expandable material.

6. The method of claim 1 wherein the expandable material is epoxy based.

7. The method of claim 1 wherein the step of attaching the expandable material includes molding the expandable material upon the skeleton member.

8. The method of claim 1 wherein the step of attaching the expandable material includes extruding the expandable material upon the skeleton member.

9. A method of reinforcing a structure of an automotive vehicle, the method comprising:
    providing a plastic skeleton member, wherein:
        i. the skeleton member includes a plurality of ribs disposed and spaced apart along the length of the skeleton member;
    attaching an expandable material to the skeleton member to form a reinforcement member, wherein:
        i. the expandable material is substantially non-tacky to the touch; and
        ii. the step of attaching the expandable material to the skeleton member includes molding of the expandable material;
    locating the reinforcement member within a cavity of the structure of the automotive vehicle; and adhering the expandable material to walls of the structure defining the cavity for forming a reinforced system, wherein;
  i. the step of adhering the expandable material includes activating the expandable material to foam.

10. The method of claim 9 wherein the skeleton member includes an opening suitable for passage of a component therethrough.

11. The method of claim 9 wherein the skeleton member and the structural foam cooperatively seal the cavity to block passage of materials through the cavity.

12. The method of claim 9 wherein the structure of the automotive vehicle is selected from a roof rail, a pillar or a frame member.

13. The method of claim 9 wherein the expandable material is in sealing contact with the skeleton member.

14. The method of claim 9 wherein the expandable material is epoxy based and the skeleton members includes at least one laterally extending rib and at least one longitudinally extending rib and the at least one laterally extending rib intersects the at least one longitudinally extending rib, 15. The method of claim 9 wherein the skeleton member is formed of a fiber reinforced polyamide.

16. The method of claim 9 wherein the expandable material is designed to expand in a paint or e-coat oven.

17. A method of reinforcing a structure of an automotive vehicle, the method comprising:
  providing a skeleton member, wherein:
    i. the step of providing the skeleton member includes injection molding the carrier to a desired shape;
    ii. the skeleton member is formed of a plastic; and
    iii. the skeleton member includes a plurality of ribs disposed along the length of the skeleton member;
  attaching a expandable material to the skeleton member to form a reinforcement member, wherein:
    i. the expandable material is a heat activatable material;
    ii. the expandable material is epoxy-based;
    iii. and the plurality of ribs is substantially devoid of the expandable material; and
    iv. the expandable material is substantially non-tacky to the touch;
  locating the reinforcement member within a cavity of the structure of the automotive vehicle; and
  adhering the expandable material to walls of the structure defining the cavity for forming a reinforced system, wherein;
    the step of adhering the expandable material includes activating the expandable material to foam; and
    ii. curing the expandable material to bond the expandable material to the walls of the structure.

18. The method of claim 17 wherein the skeleton member includes one or more extensions extending therefrom.

19. The method of claim 17 wherein at least two of the plurality of ribs are in spaced apart opposing relation to each other and wherein the expandable material extends substantially continuously about a circumference of the skeleton member.

20. The method of claim 17 wherein the step of attaching the expandable material includes molding the expandable material upon the skeleton member.

* * * * *

UNITED STATES PATENT AND TRADEMARK OFFICE
CERTIFICATE OF CORRECTION

| | | |
|---|---|---|
| PATENT NO. | : 7,160,491 B2 | Page 1 of 1 |
| APPLICATION NO. | : 11/136058 | |
| DATED | : January 9, 2007 | |
| INVENTOR(S) | : William J. Barz et al. | |

It is certified that error appears in the above-identified patent and that said Letters Patent is hereby corrected as shown below:

Column 7, Line 21, replace "," with --.-- at the end of the sentence.

Signed and Sealed this

Third Day of July, 2007

JON W. DUDAS
*Director of the United States Patent and Trademark Office*